United States Patent [19]
Raske et al.

[11] Patent Number: 4,480,705
[45] Date of Patent: Nov. 6, 1984

[54] PLATFORM CALIBRATION FACTOR FOR CONVEYOR INCLINATION ANGLE

[75] Inventors: Theodore F. Raske, Germantown; Phillip L. Lee, Greenfield, both of Wis.

[73] Assignee: Rexnord Inc., Brookfield, Wis.

[21] Appl. No.: 405,641

[22] Filed: Aug. 5, 1982

[51] Int. Cl.³ .................... G01G 19/52; G01L 25/00
[52] U.S. Cl. .......................................... 177/50; 177/1; 73/1 B
[58] Field of Search ....................... 177/1, 16, 50, 165; 73/1 B

[56] References Cited

U.S. PATENT DOCUMENTS

| | | | |
|---|---|---|---|
| 3,331,457 | 7/1967 | Blubaugh | 177/16 |
| 3,976,150 | 8/1976 | Wilson et al. | 177/16 |
| 4,353,427 | 10/1982 | Stock et al. | 177/16 X |

Primary Examiner—George H. Miller, Jr.

[57] ABSTRACT

A method for measuring the weight of material carried by a moving conveyor belt at an angle to the horizontal and passing over a belt scale, and a method for calibrating the belt scale under actual field conditions using previously determined calibration curves.

8 Claims, 6 Drawing Figures

PLATFORM CALIBRATION FACTOR FOR CONVEYOR INCLINATION ANGLE

BACKGROUND OF THE INVENTION

This invention relates generally to conveyor belt weighing systems, and more particularly to a system, and a method for calibrating this system, for accurately weighing material transported by the system despite variations in the angle of inclination of the conveyor to the horizontal.

The weighing of material in many industrial situations, such as coal and iron mines, is accomplished by the continuous weighing method. This method uses weigh scales of the type with which the present invention is concerned in conjunction with belt conveyors that transport the bulk materials. The amount of conveyed material can be determined by continuously weighing the material passing over the weigh scale in a known period of time. In general, the continuous weighing method is extremely accurate as long as the belt scale is operated in a horizontal plane.

The difficulty has been that the weigh bridge is generally calibrated for a horizontal conveyor, and this calibration is not adjusted when the conveyor angle is changed either upwardly or downwardly. If the calibration is adjusted for a change in the conveyor angle, it is generally modified as a function of the cosine of the conveyor angle. Accordingly, for a positive (upward) conveyor angle, the modification factor used as 1/cos. Further, no modification factor is suggested for a negative (downward) conveyor angle.

Thus, there exists a need for a method of calibrating a belt scale wherein a calibration factor is defined to adjust the output signal of weigh bridge when the conveyor is inclined at either a negative or positive angle.

SUMMARY OF THE INVENTION

The present invention is directed to a method for weighing material conveyed by a moving belt and calibrating the weigh bridge which measures the weight of the material conveyed by said belt.

A belt conveyor weigh bridge assembly is installed in the frame work of a conveyor. The weigh bridge comprises low receiving weigh arms connected to the frame by mechanical hinges that allow the weigh arms to yield under a load imposed by the belt conveyor. The weigh bridge further comprises a weigh idler, and a load cell positioned in a receptacle below said idler. The output signal of the load cell together with the output signal of an electronic speed transducer, which monitors the belt speed, provides the necessary inputs to an integrator which multiplies the weight and speed signals to produce a totalized weight signal. The integrator, the speed transducer, and the weigh platform constitute a belt scale.

In accordance with the invention, the mechanical calibration factor is determined by first placing the weigh bridge in a level position with a known weight resting on the weigh arms whereby an output signal is produced from the load cell. Secondly, the known weight is placed above the load cell weigh idler position and again the output of the load cell is recorded. This procedure is repeated for the platform inclined at both positive and negative angles. In this manner, a set of non-linear curves relating the mechanical calibration factor to conveyor angles is generated for level, uphill, and downhill conveyor angles.

Accordingly, it is an object of this invention to provide a belt scale weighing system which provides an accurate reading despite variations in the conveyor belt angle.

A further object is to provide a method for calibrating the weigh bridge in the field when the conveyor angle changes due to field conditions.

The various features of novelty which characterize the invention are pointed with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

Figure 1:
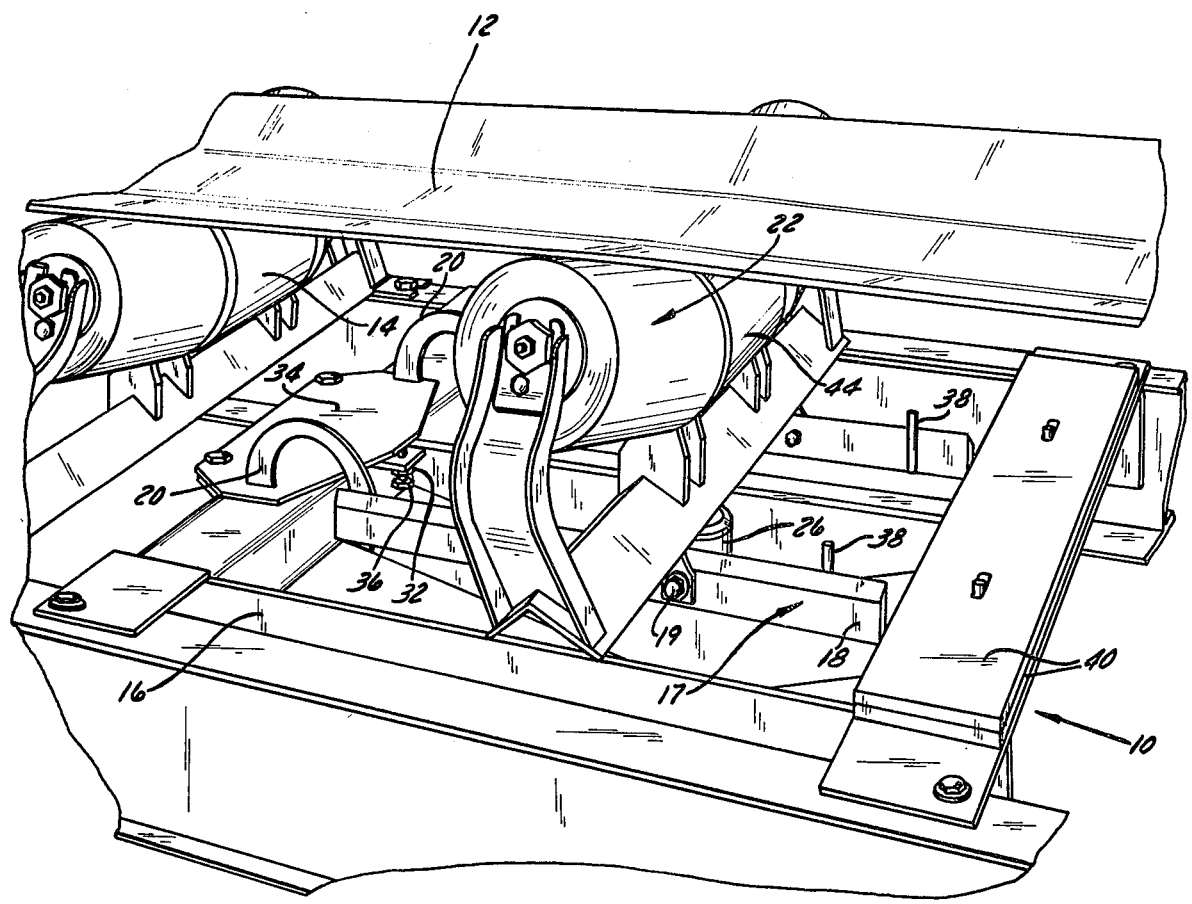
FIG. 1 is a perspective view of the weigh bridge.

FIG. 1 illustrates a conveyor belt 12 supported upon a plurality of support idlers 14. Beneath the conveyor belt 12 is a belt scale 10 for continuously weighing the material transported thereupon comprising a weigh bridge 17 having a frame 16, two spaced-apart weigh arms 18, and a yieldable mechanical hinge 20 connecting one end of each weigh arm 18 to said frame 16, a weigh idler 22 mounted on and transverse to said weigh arms 18 (bolts 19 merely hold the weigh idler in position) and a load cell 26. Parallel and spaced below the weigh idler 22 is a bar member 24 that impinges the load cell 26 which is positioned in a receptacle beneath said weigh idler 22. The weigh idler 22 is supported above the load cell 26, therefore the weigh idler 22 transmits the force generated by the weight of the material it supports to the load cell 26. The weigh idler 22 when placed on the weigh arms 18 is free to move up and down as material is processed over the belt scale. Consequently the load cell output is a function of the weight of the material resting upon a weigh span of the belt. A weigh span is defined as the length of belt 12 over which material is weighed. It is determined by idler spacing and is equal to one-half the distance from the weigh idler 22 to the downstream support idler 14 plus one-half the distance from the weigh idler 22 to the upstream idler 14. The weigh idler 22 therefor supports one-half of the total belt weight between the downstream and upstream idlers 14 plus one-half of the total material weight between the downstream and upstream idlers 14.

Generally to install the weigh bridge 17, one of the existing support idlers 14 is removed and replaced by the weigh bridge. The weigh bridge is generally placed in the conveyor with the hinge side toward the head pulley but may be placed with the hinge side toward the tail pulley. The weigh idler 22 is mounted on the weigh bridge 17 and takes the place of the support idler which was removed.

The total weight of material handled by the conveyor belt 12 during a period of time is a function of the linear velocity of the belt during that time. This velocity is measured by a speed pickup encoder (not shown). The speed pickup may be an optical encoding device, which outputs a fixed number of electrical pulses per revolution of its shaft, which is generally coupled to a pulley which has positive contact with the conveyor belt 12 at all times, such as the tail pulley. The head pulley is generally undesirable since the belt may slip in this location creating belt speed errors affecting scale accuracy. By counting the number of pulses which are outputted in a time period of known duration, by knowing the resolution (i.e. the pulses per revolution) of the encoder, and by knowing the diameter of the pulley on which the encoder is mounted, the belt speed is computed. The output signals of the load cell 26 and the speed pickup device provides the necessary inputs to an electronic integrator (not shown), which may be a microprocessor-based electronics package. Here the inputs are continuously integrated and recorded to provide readings of both the instantaneous rate of flow and cumulative weight of the material which has passed over the belt scale 10. The speed pickup device, integrator, and recorder are well known, commercially available items, the details of which form no part of the present invention. Thus, the load signal output of load cell 26 is appropriately processed and recorded in a manner well known to those skilled in the art.

Figure 2:
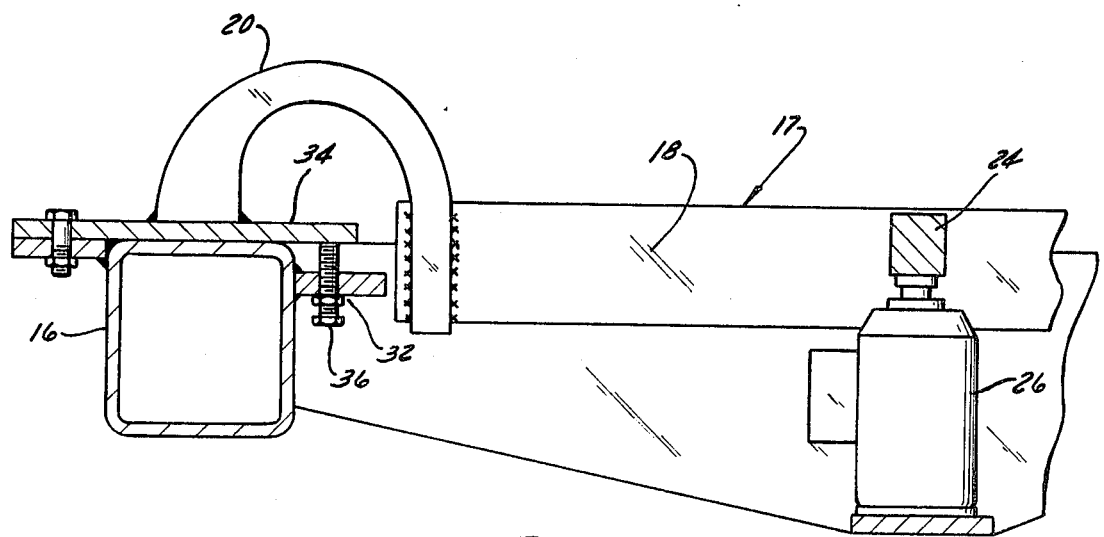
FIG. 2 is an elevtion view, partly broken away, of a weigh bridge.

As shown in FIG. 2, the yieldable mechanical hinge 20 generally comprised C-shaped members connected to said frame 16 and said weigh arms 18, for flexing motion in response to a load applied to said weigh idler 22. This mechanical hinge 20 supports a portion of the loading on the belt scale. A bending moment occurs in hinge 20 as weight is applied to the weigh bridge 10. The magnitude of this moment increases and thus causes a deflection onto the load cell 26 which is proportional to the magnitude of the load. Generally, the full range of load cell deflection is only 0.005 inches (0.127 mm), so the amount of bending movement at the mechanical hinge 20 must also be very small. Intermediate said mechanical hinge 20 and said frame 16 is a tare adjustment means 32 comprising a plate member 34 movably connecting said mechanical hinge 20 to said frame 16, and an adjustment screw 36 mounted on said frame 16 and cooperating with said plate member 34 to displace said hinge and said weigh arms in order to utilize the full range of the load cell 26, which in turn will make accuracy easier to achieve. The tare adjustment means 32 allows one to mechanically tare out the deadload of the weigh idler 22 and the empty conveyor belt 12. Therefore, a greater range of load cell deflection is made available purely for material loading.

Figure 3:
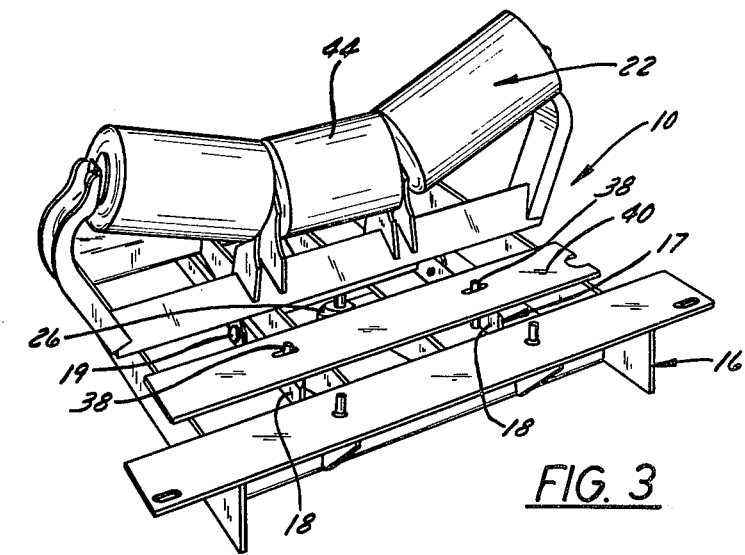
FIG. 3 is a perspective view of the weigh bridge showing the position for holding the calibration weights on the weigh arms.

In FIG. 3, calibration pins 38 are illustrated connected to said weigh arms 18 for holding precision calibration weights 40 in plce on said weigh arms 18 to obtain an output from said load cell 26.

Figure 4:
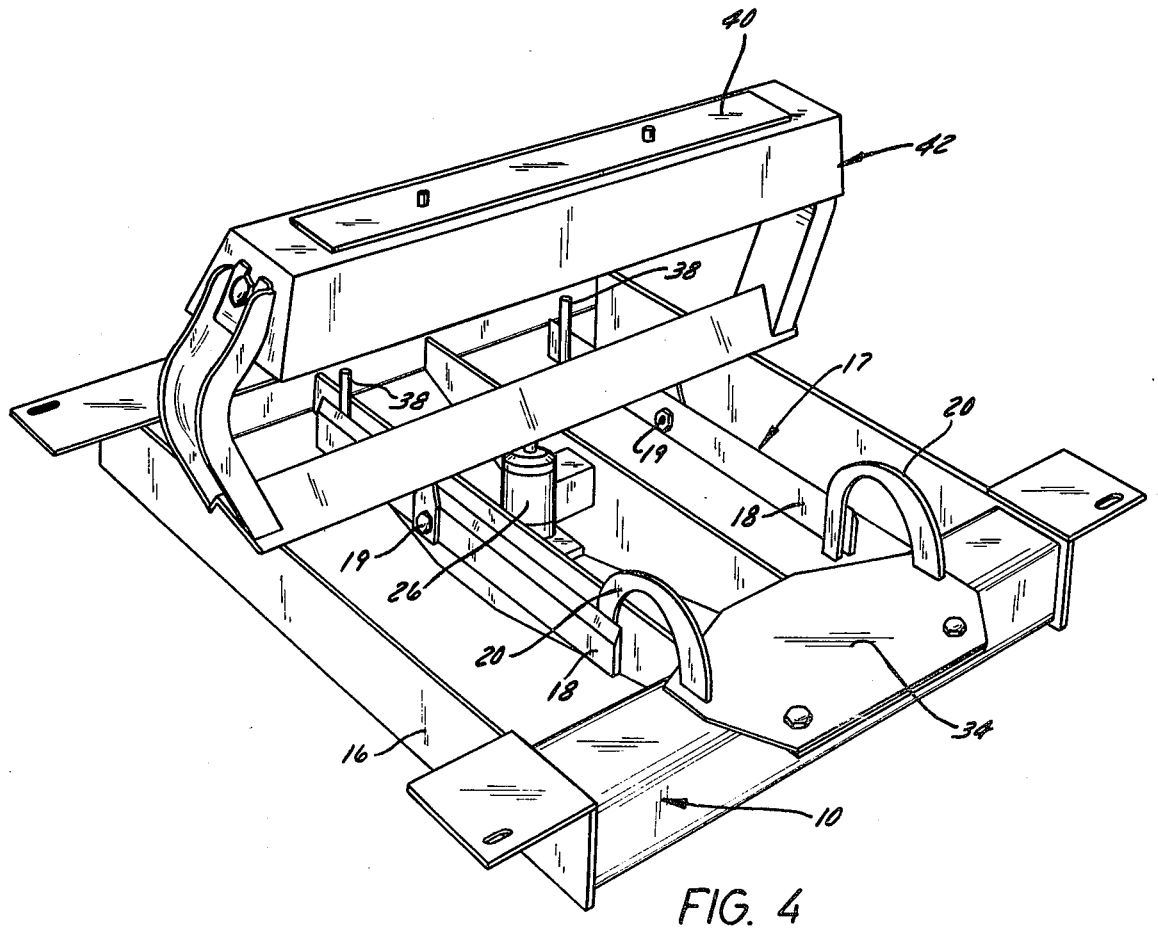
FIG. 4 is a perspective view showing the position for holding the calibration weights above the load cell.

As shown in FIG. 4, during static calibration of the belt scale 10, the weigh idler 22 is replaced by calibration member 42 in order that said calibration weights 40 may be placed above the load cell 26 to record an output from said load cell. The calibration member 42 must be the same weight and at the same elevation as the weigh idler 22. This elevation is referenced to the top of the center roller 44 of the weigh idler 22. If the load of the test weights 40 is not transmitted to the load cell 26 at a one-to-one ratio, it is necessary to accurately establish the true ratio.

Figure 5:
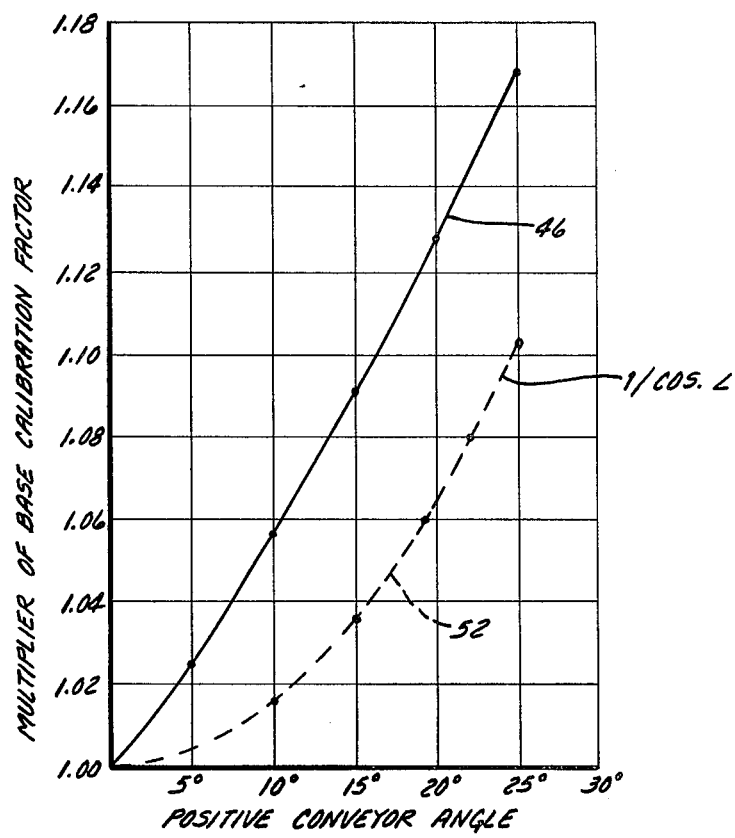
FIG. 5 is a diagram illustrating a non-linear curve relating the calibration factor to a positive conveyor angle.
Figure 6:
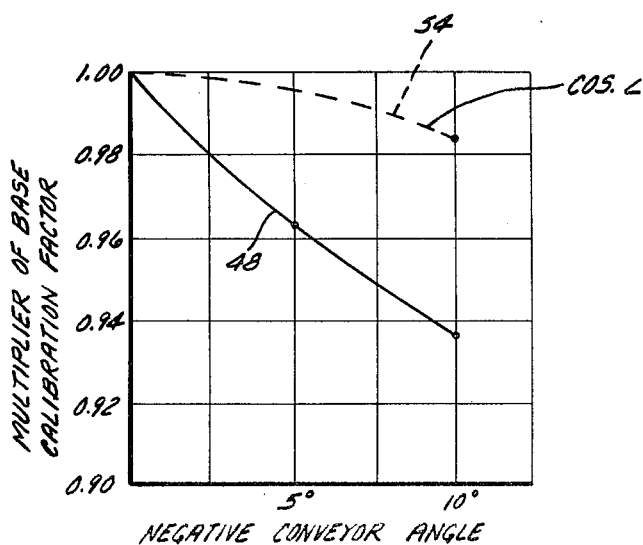
FIG. 6 is a diagram illustrating a non-linear curve relating the calibration factor to a negative conveyor angle.

In the field, the belt scale 10 must be adjusted to the customer's conveyor application, environment and service requirements. Accordingly, a mechanical calibration factor as illustrated in FIGS. 5 and 6 is determined from a previous static test utilizing test weights 40 to simulate a known load on the belt scale 10 and to establish a true ratio of the weights 40 above the load cell 26. These figures were obtained by, but not limited to, the following laboratory tests:

TEST 1

| | | | POSITIVE CONVEYOR ANGLE | | | | | |
|---|---|---|---|---|---|---|---|---|
| Test Run No. | Weigh Bridge Angle | Load on Calibration Pins | Load On Calibration Member Above Load Cell | Cell Input Volts | Tare M.V. | M.V. with Load on Calibration Pins | M.V. with Load Above Load Cell | Zero Tare C.F. |
| 1 | 0° | 18# | | 15.05 | 2.504 | 13.462 | | |
| 2 | 0° | | 18# | 15.05 | 2.500 | | 10.351 | 1.396 |
| 3 | 0° | 36# | | 15.05 | 2.502 | 24.410 | | |
| 4 | 0° | | 36# | 15.05 | 2.504 | | 18.125 | 1.402 |
| 5 | 0° | 54# | | 15.05 | 2.505 | 35.340 | | |
| 6 | 0° | | 54# | 15.05 | 2.500 | | 25.970 | 1.401 |
| 7 | 0° | 72# | | 15.05 | 2.503 | 46.320 | | |
| 8 | 0° | | 72# | 15.05 | 2.502 | | 34.100 | 1.387* |
| | | | | | | | Average = | 1.400 |
| 9 | 5° | 18# | | 15.05 | 2.508 | 13.398 | | |
| 10 | 5° | | 18# | 15.05 | 2.508 | | 10.488 | 1.365 |
| 11 | 5° | 36# | | 15.05 | 2.505 | 24.33 | | |
| 12 | 5° | | 36# | 15.05 | 2.507 | | 18.495 | 1.365 |
| 13 | 5° | 54# | | 15.05 | 2.508 | 35.18 | | |
| 14 | 5° | | 54# | 15.05 | 2.499 | | 26.56 | 1.358* |
| 15 | 5° | 72# | | 15.05 | 2.508 | 46.25 | | |
| 16 | 5° | | | 15.05 | 2.502 | | 34.60 | 1.363 |
| | | | | | | | Average — | 1.364 |
| 17 | 10° | 18# | | 15.05 | 2.510 | 13.305 | | |
| 18 | 10° | | 18# | 15.05 | 2.506 | | 10.651 | 1.325 |

TEST 1-continued

| | | | POSITIVE CONVEYOR ANGLE | | | | | |
|---|---|---|---|---|---|---|---|---|
| Test Run No. | Weigh Bridge Angle | Load on Calibration Pins | Load On Calibration Member Above Load Cell | Cell Input Volts | Tare M.V. | M.V. with Load on Calibration Pins | M.V. with Load Above Load Cell | Zero Tare C.F. |
| 19 | 10° | 36# | | 15.05 | 2.504 | 24.06 | | |
| 20 | 10° | | 36# | 15.05 | 2.492 | | 18.778 | 1.323 |
| 21 | 10° | 54# | | 15.05 | 2.503 | 35.00 | | |
| 22 | 10° | | 54# | 15.05 | 2.499 | | 27.20 | 1.316* |
| 23 | 10° | 72# | | 15.05 | 2.503 | 45.85 | | |
| 24 | 10° | | 72# | 15.05 | 2.505 | | 35.19 | 1.326 |
| | | | | | | | Average — | 1.325 |
| 25 | 15° | 18# | | 15.05 | 2.506 | 13.087 | | |
| 26 | 15° | | | 15.05 | 2.506 | | 10.763 | 1.281 |
| 27 | 15° | 36# | | 15.05 | 2.503 | 23.70 | | |
| 28 | 15° | | | 15.05 | 2.497 | | 18.983 | 1.285 |
| 29 | 15° | 54# | | 15.05 | 2.497 | 34.35 | | |
| 30 | 15° | | | 15.05 | 2.500 | | 27.55 | 1.272* |
| 31 | 15° | 72# | | 15.05 | 2.503 | 45.09 | | |
| 32 | 15° | | | 15.05 | 2.500 | | 35.72 | 1.282 |
| | | | | | | | Average — | 1.283 |
| 33 | 20° | 18# | | 15.05 | 2.503 | 12.783 | | |
| 34 | 20° | | 18# | 15.05 | 2.507 | | 10.845 | 1.234* |
| 35 | 20° | 36# | | 15.05 | 2.507 | 23.11 | | |
| 36 | 20° | | 36# | 15.05 | 2.507 | | 19.108 | 1.241 |
| 37 | 20° | 54# | | 15.05 | 2.508 | 33.57 | | |
| 38 | 20° | | 54# | 15.05 | 2.503 | | 27.52 | 1.242 |
| 39 | 20° | 72# | | 15.05 | 2.506 | 43.93 | | |
| 40 | 20° | | 72# | 15.05 | 2.509 | | 35.89 | 1.241 |
| | | | | | | | Average — | 1.241 |
| 41 | 25° | 18# | | 15.05 | 2.505 | 12.403 | | |
| 42 | 25° | | | 15.05 | 2.504 | | 10.775 | 1.197 |
| 43 | 25° | 36# | | 15.05 | 2.506 | 22.41 | | |
| 44 | 25° | | | 15.05 | 2.503 | | 19.09 | 1.200 |
| 45 | 25° | 54# | | 15.05 | 2.498 | 32.42 | | |
| 46 | 25° | | | 15.05 | 2.502 | | 27.42 | 1.200 |
| 47 | | 72# | | 15.05 | 2.498 | 42.65 | | |
| 48 | | | | 15.05 | 2.499 | | 35.75 | 1.207* |
| | | | | | | | Average — | 1.199 |

| | 0° | 5° | 10° | 15° | 20° | 25° |
|---|---|---|---|---|---|---|
| Multiplier of Base = Calibration Factor | $\frac{1.400}{1.400} = 1.0$ | $\frac{1.400}{1.364} = 1.026$ | $\frac{1.400}{1.325} = 1.057$ | $\frac{1.400}{1.283} = 1.091$ | $\frac{1.400}{1.241} = 1.128$ | $\frac{1.400}{1.199} = 1.167$ |

TEST 2

| | | | NEGATIVE CONVEYOR ANGLE | | | | | |
|---|---|---|---|---|---|---|---|---|
| Test Run No. | Weigh Bridge Angle | Load on Calibration Pins | Load On Calibration Member Above Load Cell | Cell Input Volts | Tare M.V. | M.V. with Load on Calibration Pins | M.V. with Load Above Load Cell | Zero Tare C.F. |
| 1 | 0° | 18# | | 15.05 | 2.503 | 6.897 | | |
| 2 | 0° | | 18# | 15.05 | 2.506 | | 5.648 | 1.398 |
| 3 | 0° | 36# | | 15.05 | 2.501 | 11.292 | | |
| 4 | 0° | | 36# | 15.05 | 2.503 | | 8.745 | 1.408* |
| 5 | 0° | 54# | | 15.05 | 2.503 | 15.688 | | |
| 6 | 0° | | 54# | 15.05 | 2.506 | | 11.963 | 1.394 |
| 7 | 0° | 72# | | 15.05 | 2.504 | 20.100 | | |
| 8 | 0° | | 72# | 15.05 | 2.504 | | 15.071 | 1.400 |
| | | | | | | | Average = | 1.397 |
| 9 | 5° | 18# | | 15.05 | 2.500 | 6.891 | | |
| 10 | 5° | | 18# | 15.05 | 2.505 | | 5.519 | 1.457 |
| 11 | 5° | 36# | | 15.05 | 2.506 | 11.260 | | |
| 12 | 5° | | 36# | 15.05 | 2.508 | | 8.580 | 1.442 |
| 13 | 5° | 54# | | 15.05 | 2.508 | 15.633 | | |
| 14 | 5° | | 54# | 15.05 | 2.506 | | 11.575 | 1.447 |
| 15 | 5° | 72# | | 15.05 | 2.506 | 19.986 | | |
| 16 | 5° | | 72# | 15.05 | 2.508 | | | |
| | | | | | | | Average — | 1.449 |
| 17 | 10° | 18# | | 15.05 | 2.505 | 6.837 | | |
| 18 | 10° | | 18# | 15.05 | 2.508 | | 5.397 | 1.499 |
| 19 | 10° | 36# | | 15.05 | 2.508 | 11.159 | | |
| 20 | 10° | | 36# | 15.05 | 2.501 | | 8.256 | 1.503* |
| 21 | 10° | 54# | | 15.05 | 2.504 | 15.444 | | |
| 22 | 10° | | 54# | 15.05 | 2.507 | | 11.203 | 1.488 |
| 23 | 10° | 72# | | 15.05 | 2.507 | 19.752 | | |

TEST 2-continued

| | | | NEGATIVE CONVEYOR ANGLE | | | | | |
|---|---|---|---|---|---|---|---|---|
| Test Run No. | Weigh Bridge Angle | Load on Calibration Pins | Load On Calibration Member Above Load Cell | Cell Input Volts | Tare M.V. | M.V. with Load on Calibration Pins | M.V. with Load Above Load Cell | Zero Tare C.F. |
| 24 | 10° | | 72# | 15.05 | 2.509 | | 14.109 | 1.487 |
| | | | | | | | Average — | 1.491 |

| | 0° | 5° | 10° |
|---|---|---|---|
| Multiplier of Base Calibration Factor | $\frac{1.397}{1.397} = 1.0$ | $\frac{1.397}{1.449} = .964$ | $\frac{1.397}{1.491} = .937$ |

These tests were conducted using a 100 pound load cell (for Test 1) and a 250 pound load cell (for Test 2), a 30 inch conveyor belt, and a 35 degree troughing idler. First, the belt scale 10 is placed in a level position, i.e. a conveyor angle of 0 degree, and the calibration weight 40 is placed on the weight arms 18 and resting against the calibration pins 38 to record the load cell output. Then, the same calibration weight 40 is placed on the calibration member 42 above the load cell 26 and the load cell output is again recorded. This procedure is repeated for the belt scale 10 inclined at various positive and negative angles. in this manner, a set of nonlinear curves relating calibration factor to conveyor angle is generated for positive and negative conveyor angles. Accordingly, a zero tare calibration factor or base calibration factor is defined as the quotient of the output of the load cell when the calibration weights 40 are placed on the calibration pins 38 divided by the output of the load cell when the calibration weights 40 are positioned above the load cell 26. During the tests approximately 15.0 volts is applied to the input of the load cell 26 whereby the load cell has an output of 3 mv per volt. Further, prior to the tests a tare was applied to the load cell until an output of approximately 2.5 mv is generated. This tare voltage is subsequentially substracted from the output generated by the loaded cell, e.g. during the first test run the tare (2.504 mv) is substracted from the output with the load on the calibration pins (13.462 mv) which, in turn, is divided by the tare (2.500 mv) substracted from the output with the load above the load cell (10.351 mv) which equals a zero tare calibration factor (1.396).

Each zero tare calibration factor is similarly determined for different calibration weights and an average value is arrived at (one odd reading from each group was rejected from further analysis) as indicated by the asterisk in Test 1 and 2.

Accordingly, a multiplier of the base (zero degree) calibration factor is plotted as a set of nonlinear curves 46 and 48 for positive and negative weigh bridge angles respectively. These curves 46 and 48 can readily be compared to curves 52 and 54 for (1/cos of an angle) for positive conveyor angles and (cos of an angle) for negative conveyor angles, respectively.

The method for calibrating a weigh scale of the present invention results in the accurate determination of the weight of material transported on a belt scale, since, the belt scale, when calibrated in actual field use, while running empty, need only have the calibration weights 40 placed on the calibration pins 38 so that the load cell output is adjusted to be equal to the force directly above the load cell. This output signal is directly proportional to the force of the calibration weights multiplied by the multiplier of the base calibration factor.

What is claimed is:

1. A method for calibrating an instrument which measures the weight of material conveyed by a belt above the instrument, the instrument including a weigh bridge spaced below the belt and at an angle to the horizontal, the weigh bridge having a load cell spaced therebelow, the method comprising the steps of:
   generating a horizontal base correction factor derived from a first static load signal corresponding to the weight of known weight on a load receiving member and a second static load signal corresponding the weight of said known weight generally placed above the load cell,
   generating a second correction factor when said weigh bridge is at an angle to the horizontal derived from a third static load signal corresponding to the weight of said known weight on a load receiving member and a fourth static load signal corresponding to the weight of said known weight generally placed above the load cell,
   generating an output signal when said weigh bridge is at said angle to the horizontal and said known weight is on the load receiving member while the conveyor belt is operating in an unloaded dynamic condition, derived from a predetermined relationship of said second correction factor and a dynamic load signal corresponding to said known weight on the load receiving member.

2. A method according to claim 1 wherein said horizontal base correction factor is a quotient of said first static load signal and said second static load signal.

3. A method according to claim 1 wherein said second correction factor is a quotient of said third static load signal and said fourth static load signal.

4. A method according to claims 1 or 3 wherein said second correction factor is the divisor of the quotient of the generated output signal.

5. A method for calibrating a belt scale which measures the weight of material conveyed by a belt when the belt is at an angle to the horizontal, the belt scale including a weigh bridge having a support frame, a load receiving means, a yieldable mechanical hinge means joining one end of the load receiving means to the support frame, a troughing idler means mounted on and transverse to the load receiving means, and a load cell spaced below the idler means for contacting the idler means when a load passes over the weigh bridge, a belt speed pickup means, and a signal integrator means comprising the steps of:
   placing the weigh bridge on a horizontal plane and placing known weights on the load receiving member to put a first static load on the load cell and measuring the first output signal of the load cell, placing the weigh bridge on a horizontal plane and placing said known weights above the troughing idler to put a second static load on the load cell and measuring the second output signal of the load cell, placing the weigh bridge at an angle to the horizontal plane and placing said known weights on the load receiving member to put a third static load on the load cell and measuring the third output signal of the load cell, placing the weigh bridge at said angle to the horizontal plane and placing said known weights above the troughing idler to put a fourth static load on the load cell and measuring the fourth output signal of the load cell, developing a base correction factor as a function of said first output signal with respect to said second output signal, developing a second correction factor as a function of said third output signal with respect to said fourth output signal, placing said weigh bridge in said belt scale at said angle to the horizontal and placing said known weights on the load receiving member while the belt scale is operating in an unloaded dynamic condition, and measuring a fifth output signal of the load cell, and correcting the belt scale to provide a reading as a function of said second correction factor with respect to said fifth output signal.

6. A method according to claim 5 wherein said base correction factor is a quotient of said first output signal and said second output signal.

7. A method according to claim 5 wherein said second correction factor is a quotient of said third output signal and said fourth output signal.

8. A method according to claims 5 or 7 wherein said second correction factor is the divisor of the quotient of the corrected belt scale reading.

* * * * *